March 9, 1948.  R. J. WRAY  2,437,581
PLOW ASSEMBLY MOUNT
Filed Dec. 26, 1944  2 Sheets-Sheet 1

Inventor
Robt. J. Wray

March 9, 1948.  R. J. WRAY  2,437,581
PLOW ASSEMBLY MOUNT
Filed Dec. 26, 1944  2 Sheets-Sheet 2

Inventor
Robt. J. Wray

Patented Mar. 9, 1948

2,437,581

UNITED STATES PATENT OFFICE 2,437,581

PLOW ASSEMBLY MOUNT

Robert J. Wray, Modesto, Calif.

Application December 26, 1944, Serial No. 569,683

8 Claims. (Cl. 97—137)

This invention relates to the mounting of a plow in connection with a draft tractor, and particularly deals with the mounting of the vineyard or orchard plow shown in my patent No. 2,364,887, dated December 12, 1944.

Such a plow includes a draft frame and a disc or similar plowing element supported from the frame for automatic lateral deflection when the frame strikes a vine or tree trunk.

The plow as shown in said patent is mounted in trailing relation to the draft tractor in such a manner as to enable the entire plow structure to be deflected laterally relative to the line of draft in the event that the automatic deflection of the plow element is not sufficient to clear the trunk, while enabling the structure to reassume its normal position as soon as the trunk is cleared.

The major object of the present invention is to provide a mounting arrangement for the plow which, while retaining all the advantages of the trailing type of mounting, enables the plow frame to be disposed between the front and rear wheels of tractors of a certain type in suspended draft relation to the frame of such tractor.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
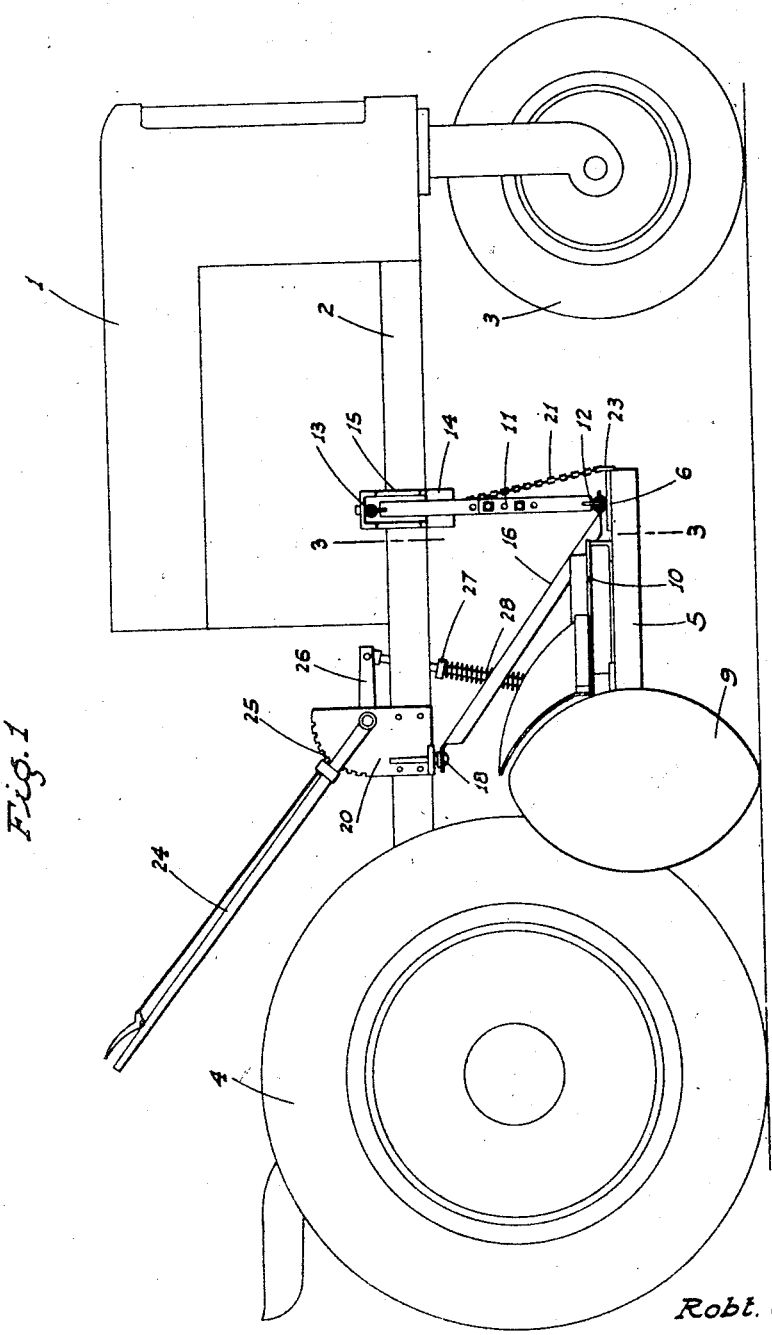
Figure 1 is a side outline of a wheel-type tractor, showing the improved mounting for the vineyard plow.
Figure 2:
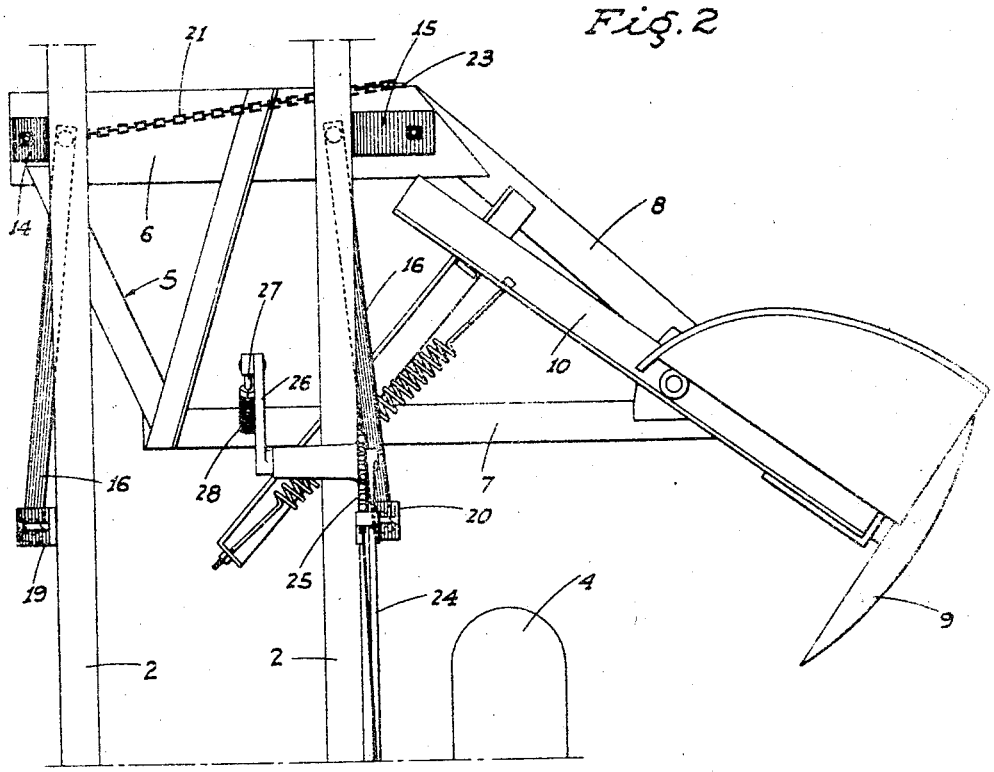
Figure 2 is a top plan view of the plow structure and its mounting assembly, in connection with the side frames of the tractor.
Figure 3:
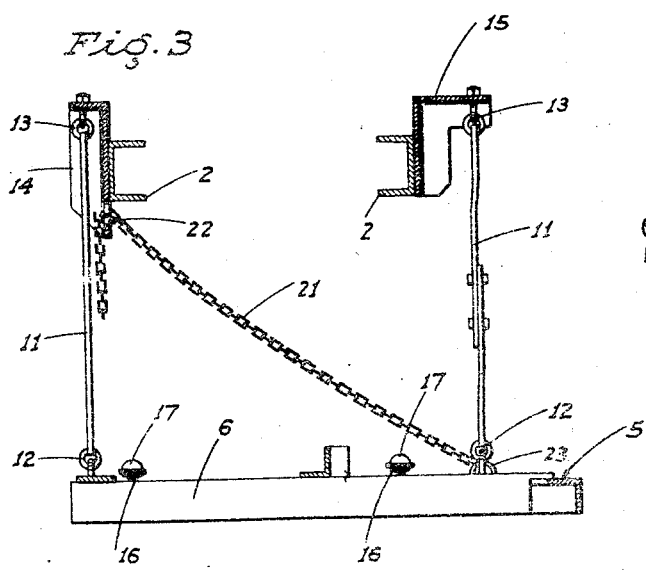
Figure 3 is a transverse section on line 3—3 of Fig. 1.
Figure 4:
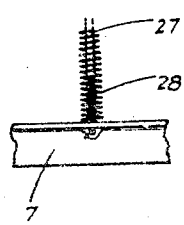
Figure 4 is a fragmentary transverse elevation showing the connection between the adjustment lever-link and the plow frame.

Referring now more particularly to the characters of reference on the drawings, the tractor 1 to which the improved plow mounting assembly is connected, includes relatively high side frames 2 supported by spaced front and rear wheels 3 and 4 respectively.

The plow structure itself comprises a rigid horizontal frame 5 which includes transverse front and rear frame beams 6 and 7 and a side beam 8 connecting beams 6 and 7 and extending at a lateral diagonal. The automatically yieldable plow disc 9 is disposed laterally out from and rearwardly of beam 8, and is mounted on a spring-held horizontally swingable arm 10, in substantially the same manner as shown in the aforementioned patent.

The longitudinal extent of frame 5, relative to the line of draft, is considerably less than the distance between the front and rear wheels of the tractor, while the transverse extent of beam 6 is greater than the distance between tractor frames 2, below which the plow frame is disposed with beam 6 in nearly centralized relation to said tractor frame.

Beam 6 is suspended from the tractor frames 2 by vertical links 11, swivelly connected at their lower end to said beam 6 as at 12, and swivelly hung at their upper end as at 13 from brackets 14 and 15 secured on and projecting laterally out from frames 2.

Compression bars 16 extend upwardly and rearwardly from beam 6 to which they are connected by suitable swivel or universal joints 17. At their upper rear end, the bars are connected by similar joints 18 to brackets 19 and 20 secured on and projecting laterally out from frames 2.

A chain 21 or the like is adjustably connected to bracket 14 (which is on the side opposite plow disc 9) under adjacent frame 2 as at 22 and extends thence diagonally downward and transversely of the line of draft to a connection with beam 6 on the opposite side of the tractor as at 23.

It will therefore be seen that the plow frame is connected in draft relation to the tractor and while substantially immovable relative thereto in a longitudinal direction, is free to shift laterally in a direction to slacken the chain as a rigid obstruction encountered by the laterally projecting side of the plow frame may require. This freedom of movement is of course rendered possible by the swivel connections between the draft links and bars with the tractor and plow frames.

At the same time, the plow frame, and disc 9, may raise and lower as may be required, since the draft connections with the plow frame are on a single transverse line on the front plow beam 6.

Raising and lowering of the plow frame and control of the plowing depth, is effected by means of a hand lever 24 pivoted on bracket 20, a holding panel and quadrant unit 25 being arranged with the lever and bracket.

An arm 26 projects forwardly from the lever pivot between the frames 2, a depending link 27, the lower part of which is a stiff compression spring 28, being connected to said arm and to the rear plow frame beam 7 intermediate its ends.

The spring is sufficiently stiff to sustain the weight of the plow structure, while having sufficient yieldability laterally to allow the structure to shift laterally as operating conditions may necessitate.

As will be seen, the link 11 on the disc side of the structure while rigid, is capable of elongation or contraction. This enables the plow to be leveled transversely in the event that the tractor has a transverse tilt, as is sometimes the case when working in a plowed orchard or vineyard, and one wheel of the tractor follows along a furrow.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In combination of a tractor having side frames and spaced front and rear wheels, and a plow structure having a substantially horizontal frame disposed under said tractor frames in the space between the front and rear wheels, vertical suspension links extending between and swivelly connected to the tractor frames and to the forward end of the plow frame, and draft bars swivelly connected to the forward end of said plow frame and extending upwardly and rearwardly at an angle lengthwise of the tractor to connection with said tractor frames at points spaced lengthwise of the tractor from the points of connection of the links therewith, the swivel connection of the links and draft bars being operable to allow the plow frame to swing laterally of the tractor frame.

2. A structure as in claim 1, in which the points of connection of the links and bars with the plow frame lie in a common line transversely of the tractor.

3. A structure as in claim 1, in which the points of connection of the links and bars with the plow frame are arranged to allow of swivel movement of the plow frame in a vertical plane and rearwardly of said points of connection, and manually operable means to control such vertical swivel movement.

4. In the combination of a tractor having side frames and spaced front and rear wheels, and a plow structure having a substantially horizontal frame disposed under said tractor frames in the space between the front and rear wheels, vertical suspension links extending between and swivelly connected to the tractor frames and plow frame adjacent the forward end of the latter, draft bars swivelly connected to said plow frame adjacent its forward end and extending thence upwardly at an angle lengthwise of the tractor to swivel connection with said tractor frames and means to raise and lower the plow frame including a hand lever mounted on the tractor and a link unit between the lever and plow frame and including a laterally yieldable element connected to said plow frame rearwardly of its forward end.

5. A structure as in claim 4 with a flexible tension element connected at one end to the plow frame adjacent one side thereof and extending thence upwardly and transversely to connection with the opposed tractor frame.

6. The combination with a tractor having a frame supported on front and rear wheels, of a substantially horizontal plow frame interposed between the front and rear wheels of the tractor, a depending suspension link connecting the forward end of the plow frame with the tractor frame, the ends of the link being flexibly connected with the tractor frame and plow frame respectively to allow the plow frame to freely swing laterally of the tractor frame, and a draft bar extending from the forward end of the plow frame and inclining upwardly and rearwardly to a connection with the tractor frame, the ends of the draft bar having universal connections with the plow frame and tractor frame, respectively, to allow of said lateral swinging of the plow frame.

7. A combination as in claim 6 including means between the plow frame and tractor frame to limit the lateral swinging movement of the plow frame.

8. A combination as in claim 6 including a normally slack chain interposed between the plow frame and the tractor frame and operable to limit the lateral swinging movement of the plow frame.

ROBERT J. WRAY.

REFERENCES CITED

The following references are of record in the file of this patent:

UNITED STATES PATENTS

| Number | Name | Date |
|---|---|---|
| 1,378,196 | Plettner et al. | May 17, 1921 |
| 1,566,229 | Scanlan | Dec. 15, 1925 |
| 2,050,424 | Davis | Aug. 11, 1936 |